May 8, 1951 V. J. ILLE 2,551,747
DRAFTING APPARATUS
Filed Nov. 22, 1949 2 Sheets-Sheet 1
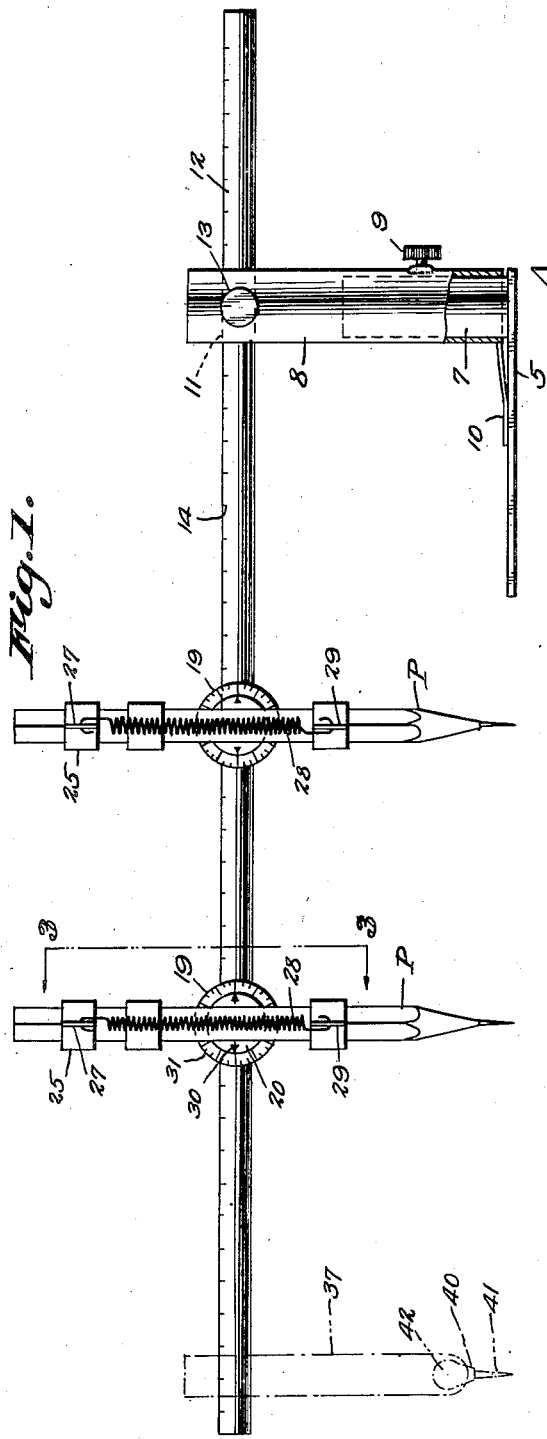
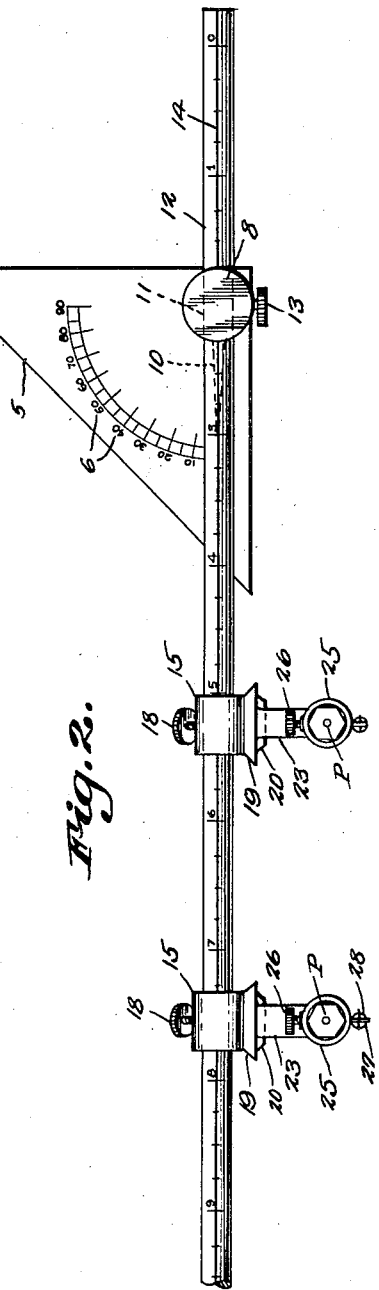
V. J. Ille
INVENTOR
BY C. A. Snow & Co.
ATTORNEYS.

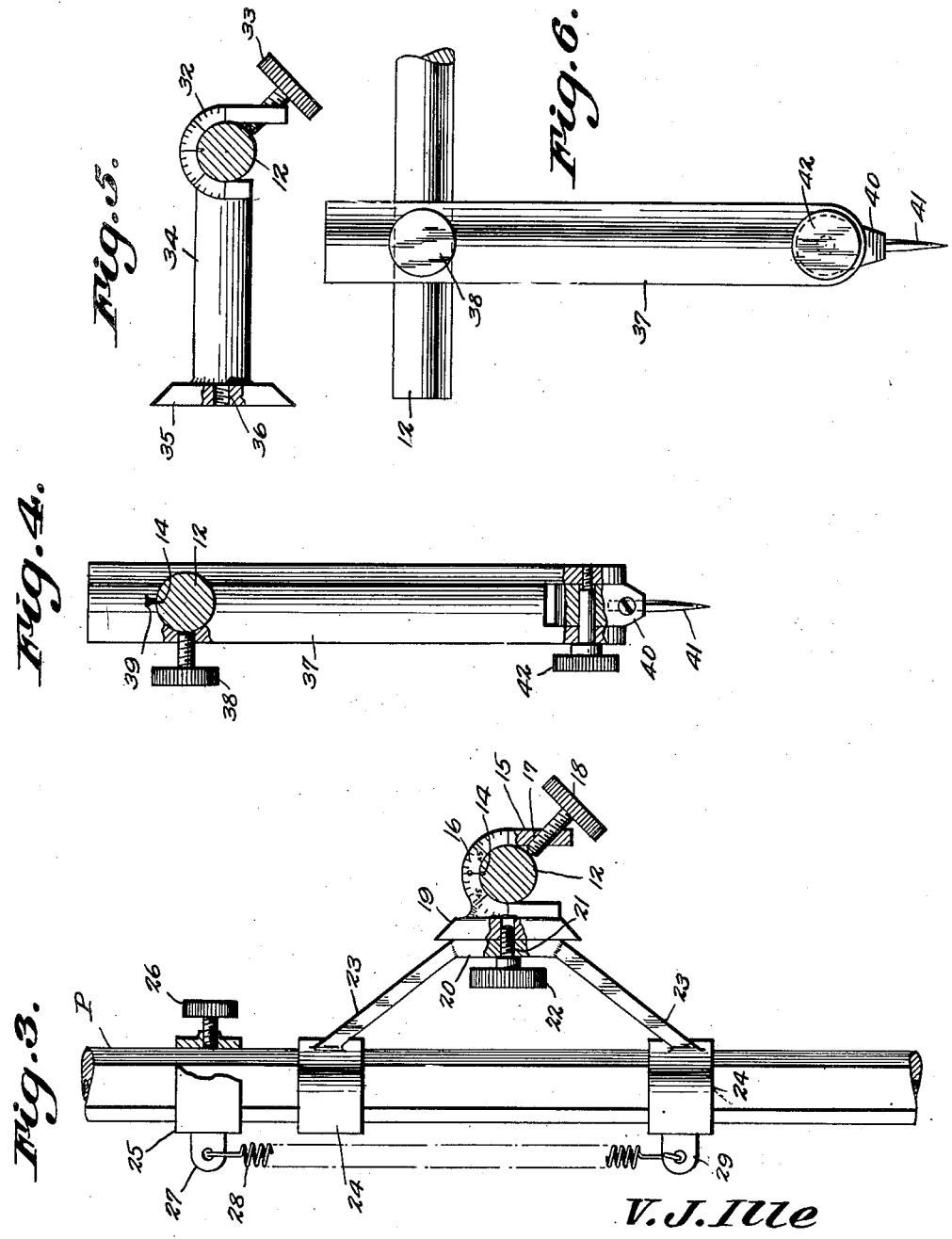

Patented May 8, 1951

2,551,747

UNITED STATES PATENT OFFICE 2,551,747

DRAFTING APPARATUS

Vincent John Ille, Levelland, Tex.

Application November 22, 1949, Serial No. 128,833

1 Claim. (Cl. 33—27)

This invention relates to apparatus used for drafting purposes, in the nature of a combination multiple ruling device and compass.

The main object of the present invention is to permit the drawing of any combination of parallel lines spaced at equal or unequal distances, the drawing of circles within circles or any portion thereof, or the drawing of a series of squares, triangles, or other geometrical figures of any size or combination.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Fig. 1 is a side elevational view of apparatus constructed in accordance with the invention the dotted lines illustrating the position of a compass pivot member or rest.

Fig. 2 is a top plan view, portions being broken away.

Fig. 3 is an enlarged section on line 3—3 of Fig. 1.

Fig. 4 is a side elevational view, portions being shown in transverse section, of the compass pivot member or rest.

Fig. 5 is an elevational view of an extension member.

Fig. 6 is a front elevational view of the compass or pivot member shown in Fig. 4.

Referring to the drawings in detail, I provide a base for the device in the form of a flat triangular plate 5 having the degree scale 6 for a purpose to become apparent hereinafter. The flat base 5 is in the form of a right triangle, as readily seen from Fig. 2, and rigidly secured to said base and upstanding from the 90° corner of said base is the short vertically disposed cylindrical stud 7 over which is removably and adjustably fitted the lower end of the tubular sleeve 8, said sleeve 8 being secured to the stud 7 in selected positions of relative rotary adjustment by means of the set screw 9 that is threadable through the wall of said sleeve. Rigid with and extending horizontally from the lower end of the sleeve 8 is the pointer 10 adapted to traverse the arcuate degree scale 6. Thus, by loosening of the set screw 9, the sleeve 8 can be adjusted rotatably upon the stud 7, the pointer 10 indicating the degree to which the adjustment is being made, and when the pointer is positioned at the exact degree desired by the user, the set screw 9 is tightened so as to hold the sleeve 8, stud 7, and triangular base 5 against relative movement from the selected position of adjustment.

Formed in the upper end portion of the sleeve 8 is the transverse opening 11 through which is positioned the elongated cylindrical beam 12, said beam 12 being secured against movement relative to the sleeve 8, in any desired position to which the beam is slidably adjusted within the opening 11, by means of a set screw 13 threadable through the wall of the sleeve and against the beam.

As best seen from Fig. 2, the beam is inch marked as at 14, these inch markings being provided along a straight line extending longitudinally of and from end to end of the beam and best seen in Fig. 2.

Adjustably mounted upon the beam is a plurality of split collars 16 each of which is capable of being slid along the beam to any selected position, and each of which is additionally adapted to be lifted bodily from the beam by means of being formed in an inverted U-shape, as best seen from Fig. 3.

The collars 16 are each formed with openings 17 disposed radially of the beam 12 (see Fig. 3) when the collars are supported upon the beam, and these openings 17 are threaded to receive set screws 18. Thus, after the collars are deposited upon the beam, and slidably adjusted to selected positions, they can be secured in such positions by means of the set screws 18. Each collar 15, as may be noted from Fig. 3, is provided with degree markings 16, thus it may be observed that not only may the collars be slidably adjusted along the beam, or removed entirely from the beam, but also, said collars may be rotatably adjusted upon said beam, until a particular degree marking desired by the user lines up with the longitudinal inch marked line 14 of the beam 12. This is for the purpose of positioning pencils P supported from said collars at selected angles relative to the staff or sleeve 8.

Formed upon each of the collars 15 is a flat surfaced facing 19, on which is swivelly mounted a yoke 20 the center portion of which is flat for contact with the facing 19, and which center portion of the yoke is formed with a threaded opening 21 receiving screw 22 that also threads into a threaded opening formed in the facing 19. Thus, the yoke 20 can be swivelly adjusted to selected positions relative to the collar 15, and after having been so adjusted, can be secured in said positions by tightening of the set screw 22.

Formed upon the yoke 20 are the outwardly diverging yoke arms 23 each of which is formed with a generally annular guide 24 through which is slidably inserted the pencil P. Above the uppermost guide 24, a ring 25 is mounted upon the pencil P, and is secured rigidly to the pencil by means of a set screw 26. The ring 25 has a laterally extended ear 27 apertured to receive one end of a spring 28, the other end of which is hooked to an ear 29 extending laterally from the lowermost guide 24.

It may be seen that this construction results in the pencil P being continually urged in a downward direction, so as to keep the point of the pencil in firm contact with the surface of the drawing board.

By reference to Fig. 1, it may be noted that the face of the center portion of the yoke 20 is provided with diametrically opposite index markings 30, adapted to be lined up with degree markings 31 on the facing 19 of the collar 15. This permits the user to adjust the pencils to selected angles, through a plane parallel to the beam 12, after which the set screw 22 is used to secure the pencil-engaging yokes in the positions to which they will have been adjusted.

Referring now to Fig. 5, I have here illustrated means for positioning the pencils at a greater distance from the beam 12. This means comprises a collar 32 having the set screw 33, which collar 32 is formed substantially identically to the collar 15 illustrated in Fig. 3. However, in the means illustrated in Fig. 5, the collar 32 is formed integral with a laterally extended extension arm 34 on the free end of which is provided the facing member 35 having the threaded opening 36 adapted to receive the set screw 22 of the yoke 20. The facing member 35 is degree marked like the facing member 19.

Referring now to Figs. 4 and 6, I have here illustrated a compass rest or pivot member comprising a generally cylindrical staff 37 in which is threaded a set screw 38 adapted to be threaded against the beam 12. An index 39 is provided on the staff 37 and is adapted to be lined up with the index 14 of the beam 12. This is to assure that the compass pivot member or rest will be in a position of true perpendicularity when used.

The compass member is equipped at its lower end with the holder 40 in which is mounted the point 41, the holder 40 being pivotally mounted between yoke arms formed at the lower end of the member 37, and being secured in selected positions by means of the set screw 42.

The use and advantages of the device may now be readily noted. It will be understood that any number of pencils P can be mounted, as dictated by the needs of the particular task. The mounting or dismounting of the pencils and the holders therefor is readily accomplished by the formation of the collars 15, which can be removed bodily from the beam 12 by simply being lifted therefrom after loosening of the set screws 18. In any event, the first adjustment which can be made is the adjustment of the beam to a selected angle relative to one of the straight legs of the triangular base 5, this being accomplished, as described hereinbefore, by swinging the beam over the degree scale 6 (Fig. 2) until the pointer, which will swing with the beam and which is positioned directly below the beam, lines up with one of said markings. When the pointer or index arm 10 lines up in this manner, the beam will have been positioned at the selected angle relative to the leg of the base 5, and can be tightened in the selected position by means of the set screw 9.

The beam can then be slidably adjusted longitudinally of the post 8, being locked in a selected position of adjustment by means of the set screw 13, and thereafter, any number of pencil supports can be positioned upon the beam, at selected distances from each other and at selected locations longitudinally of the beam. The pencils can be adjusted in planes transverse of the beam's axis, by proper positioning of the degree markings 16 relative to the index 14 (Fig. 3), after which the set screws 18 are tightened. Then, the pencils can be additionally adjusted to selected angles, in a plane parallel to the axis of the beam, by selected relation of the index markings 30 to the degree scales 31. The set screws 22 are now tightened. Tension of the spring is readily adjusted by proper positioning of the collars 25 and securing of said collars to the pencils of set screws 26.

A multiplicity of parallel straight lines can now be readily drawn, simply by moving the base 5 along the side of a T-square, triangle, or any other convenient template, not shown. The parallel lines can be spaced at equal or unequal distances, by proper adjustment of the parts of the device, and the draftsman is enabled to draw a series of squares, triangles, or other geometrical figures of any size or combination.

To use the device as a compass, the compass member 37 is secured to the free end of the beam, and the post 38 and base 5 are removed entirely. This permits the device to be used as a compass for drawing multiple circles and thus concentric circles of different diameters can be simultaneously drawn according to the needs of the particular task.

The compass member 37 can of course be used at either end of the device, and the compass member 37 can also be used as a reset for one end of the beam, the other end of the beam being supported by the post 8.

The extension arm illustrated in Fig. 5 can be used, if the particular drafting task should require the same.

It will be understood that mechanical pencils may be used with the instrument if desired, and within the scope of the claims, other changes may be made.

It is believed that clear advantages reside in the instrument over conventional drafting methods now employed, especially in such work as layout work, requiring a number of centers to be established, as in the case of preparation of a drawing of a heat exchanger tube sheet where the draftsman must show the holes. This can be accomplished with the present instrument by fixing to the beam several of the pencils spaced as required, and using the base as a guide to be positioned against a T-square, thereafter drawing across the paper inside the boundaries of the object. The operation would be repeated until the desired number of rows were established, after which the vertical lines would be drawn at the required angle with respect to the horizontal lines. These lines would cross on the tube hole centers.

What is claimed is:

In a drafting instrument a substantially horizontal beam, means for supporting said beam in an elevated position above a drawing surface, yokes connected to said beam, annular guides on the ends of the arms of said yokes adapted to slidably receive a drawing pencil, a ring adapted for fixed connection to said pencil above the uppermost guide, and a spring connected to said ring and to the lowermost guide for urging said pencil downwardly into contact with a drawing surface.

VINCENT JOHN ILLE.

REFERENCES CITED

The following references are of record in the file of this patent:

UNITED STATES PATENTS

| Number | Name | Date |
| --- | --- | --- |
| 964,785 | Johnson | July 19, 1910 |
| 1,007,038 | Maupin | Oct. 24, 1911 |
| 1,084,973 | Stanwood et al. | Jan. 20, 1914 |
| 1,191,725 | Paulsen | July 18, 1916 |
| 1,948,952 | Wallerius | Feb. 27, 1934 |
| 2,045,360 | Kaufmann | June 23, 1936 |
| 2,312,154 | Fischer | Feb. 23, 1943 |

FOREIGN PATENTS

| Number | Country | Date |
| --- | --- | --- |
| 155,485 | Switzerland | June 30, 1932 |